United States Patent [19]

Wooten

[11] Patent Number: 5,094,004

[45] Date of Patent: Mar. 10, 1992

[54] RAILROAD TRACK GAGER/LEVELER/LINEAR MEASURER

[75] Inventor: Cecil T. Wooten, Pine Bluff, Ark.

[73] Assignee: The United States of America as represented by the Secretary of the Army, Washington, D.C.

[21] Appl. No.: 718,701

[22] Filed: Jun. 21, 1991

[51] Int. Cl.[5] ............................ G01B 5/14; G01C 9/06
[52] U.S. Cl. ....................................... 33/338; 33/523.1; 33/366
[58] Field of Search ...................... 33/338, 523.1, 366, 33/775, 779, 780, 781, 782

[56] References Cited

U.S. PATENT DOCUMENTS

| | | | |
|---|---|---|---|
| 747,872 | 12/1903 | Ellis et al. | 33/523.1 X |
| 897,045 | 8/1908 | Young | 33/523.1 |
| 2,286,456 | 6/1942 | Boettcher | 33/523.1 |
| 5,025,566 | 6/1991 | Fiechter | 33/523.1 X |

FOREIGN PATENT DOCUMENTS 866566  5/1941  France ........................ 33/338

Primary Examiner—Harry N. Haroian
Attorney, Agent, or Firm—Anthony T. Lane; Edward Goldberg; Michael C. Sachs

[57] ABSTRACT

An instrument for measuring railroad track geometry for a pair of tracks. The instrument includes a carriage having wheels for permitting the carriage to ride on one of the tracks. An elongated cross-level bar has one end mounted on the carriage and the other end joined to a roller assembly. The roller assembly supports a pair of measuring wheels that ride on the top of the other track. A plurality of sensors are mounted on the bar for sensing the gage and cross-level of said tracks, and for measuring the linear distance that the instrument moves with respect to the tracks. A removable handle, hinged to the cross-level bar, supports a digital read-out meter for displaying the gage, cross-level and distance traversed.

6 Claims, 4 Drawing Sheets

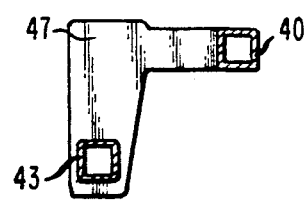
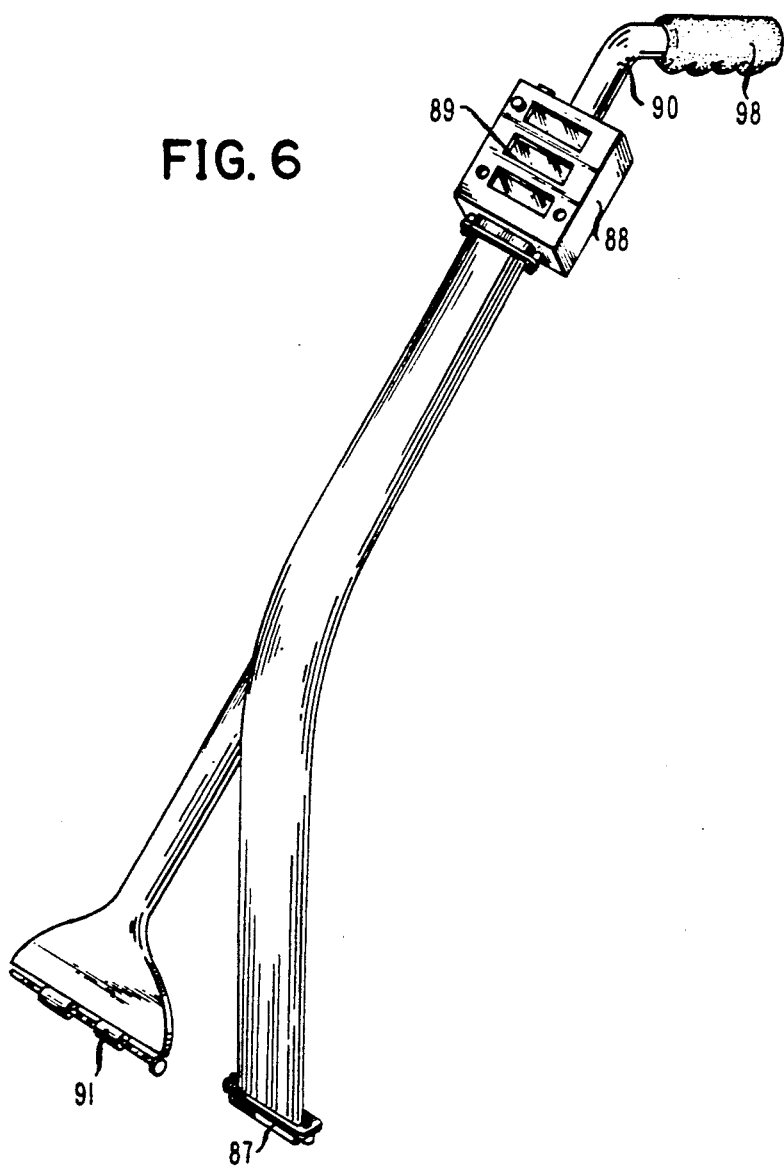
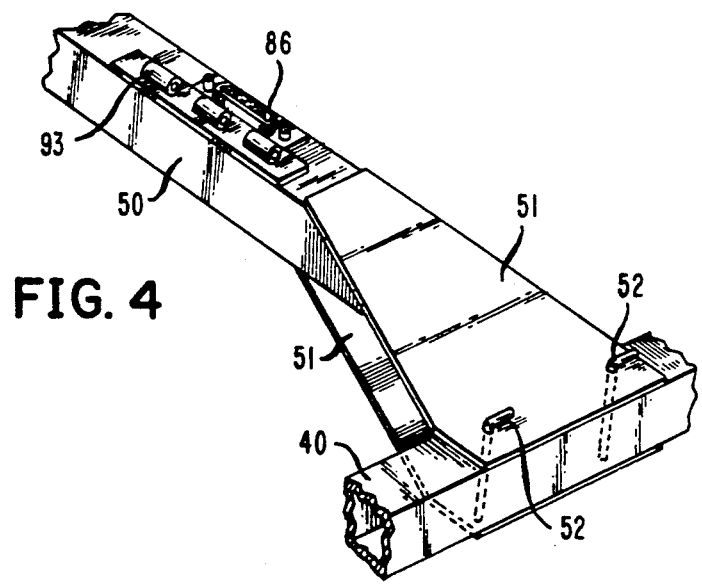

RAILROAD TRACK GAGER/LEVELER/LINEAR MEASURER

The invention described herein may be manufactured, used and licensed by or for the Government for governmental purposes without the payment to me of any royalties thereon.

BACKGROUND OF THE INVENTION

1. Field of the Invention

The present invention relates to railroad track inspection instruments that measure rail geometry. More particularly it relates to an apparatus for use by railroad track inspectors to determine gage, cross-level and length of track.

2. Description of the Prior Art

Railroad track inspectors have used a variety of instruments for gageing, cross-leveling and measuring the length of railroad track. Monitoring and maintaining proper rail geometry are critical tasks in preventing railroad car derailments, which often result in great economic and personal loss. A typical derailment can produce rail car cargo damage, car and engine damage, track damage, and personal injury or death. Additionally, significant collateral damage can also occur in those instances where dangerous cargo, such as explosives and toxic chemicals, are being transported.

In one recent study, it was determined that about half of all derailments were caused by the gage of the track being too wide or too narrow, while nearly a quarter were caused by cross-level and other rail-geometry problems. The occurrence of most rail-geometry problems were found to be the direct result of inadequate track inspections.

One currently used track inspection method acquires rail-geometry information with the use of an instrument that has a stick or bar that is placed on the track at the spot to be measured. The stick or bar usually includes a linear scale and a leveler. In this type of inspection, the gage and cross-level are determined only at the spot where the instrument is placed, and the leveler must be readjusted each time the instrument is moved to a new spot.

Another gage and level measuring instrument involves a device that is operated while the inspector walks along the track. A typical walking instrument includes rollers that ride on the track as the inspector manually directs the instrument. These instruments normally include a mechanical dial-type read-out that displays the gage.

Although the walking instruments have served the purpose, they have not proved entirely satisfactory under all conditions of service for a number of reasons. In many cases, considerable difficulty has been experienced due to the rollers catching in the track joints. Also, the dial-type read-outs on many of these devices are attached to the instrument at the track level, causing the reading of the dial to be difficult for the inspector to make while he is walking down the track. Also, conventional track level readers are equally hard to read for the same reason. Further, instruments that measure track length are supplied as separate equipment and are not a part of such conventional gage or level measuring instruments.

Because of these and other structural shortcomings with prior art instruments, track inspection procedures are labor intensive and costly. Many inspections are still performed with bar or stick gageing instruments. As such, routine annual track inspections are usually made only at and around turn-outs, curves and occasionally in spots where the track appears to be out of gage to the unaided eye. Also, because the procedure is slow and will not show the true and complete gage for continuous lengths of track, some areas of track are missed for long periods of time, eventually causing derailments at these locations.

Consequently, those concerned with the development of railroad inspection equipment have long recognized the need for substantial improvements in instruments that measure rail geometry. The present invention fulfills this need.

SUMMARY OF THE INVENTION

The general purpose of this invention is to provide a railroad track inspection instrument which embraces all the advantages of similarly employed devices and possesses none of the aforedescribed disadvantages. To attain this, the present invention contemplates a unique integrated mechanism that simultaneously measures gage, cross-level and track length while being manually propelled along the track by an inspector or while being towed by a small rail car.

More specifically, the present invention includes an instrument for measuring railroad track geometry for a track having a pair of rails. The instrument comprises a carriage having wheels for permitting the carriage to ride on one of the rails. An elongated cross-level bar has one end mounted on the carriage. A roller assembly is connected to the other end of the cross-level bar for supporting the bar and for permitting the instrument to ride on the other rail. A sensor is mounted on the bar for sensing the gage and cross-level of the rails, and for measuring the linear distance that the instrument moves with respect to the rails.

The exact nature of this invention, as well as other objects and advantages thereof, will be readily apparent from consideration of the following specification relating to the annexed drawings.

BRIEF DESCRIPTION OF THE DRAWINGS

FIG. 4 is a pictorial, break-away view of a detail of the preferred embodiment.

FIG. 5 is a sectional view of a detail of the preferred embodiment taken on the line 5—5 of FIG. 1 and looking in the direction of the arrows.

FIG. 6 is a pictorial view of a detail of the preferred embodiment.

DETAILED DESCRIPTION OF THE PREFERRED EMBODIMENT

Figure 1:
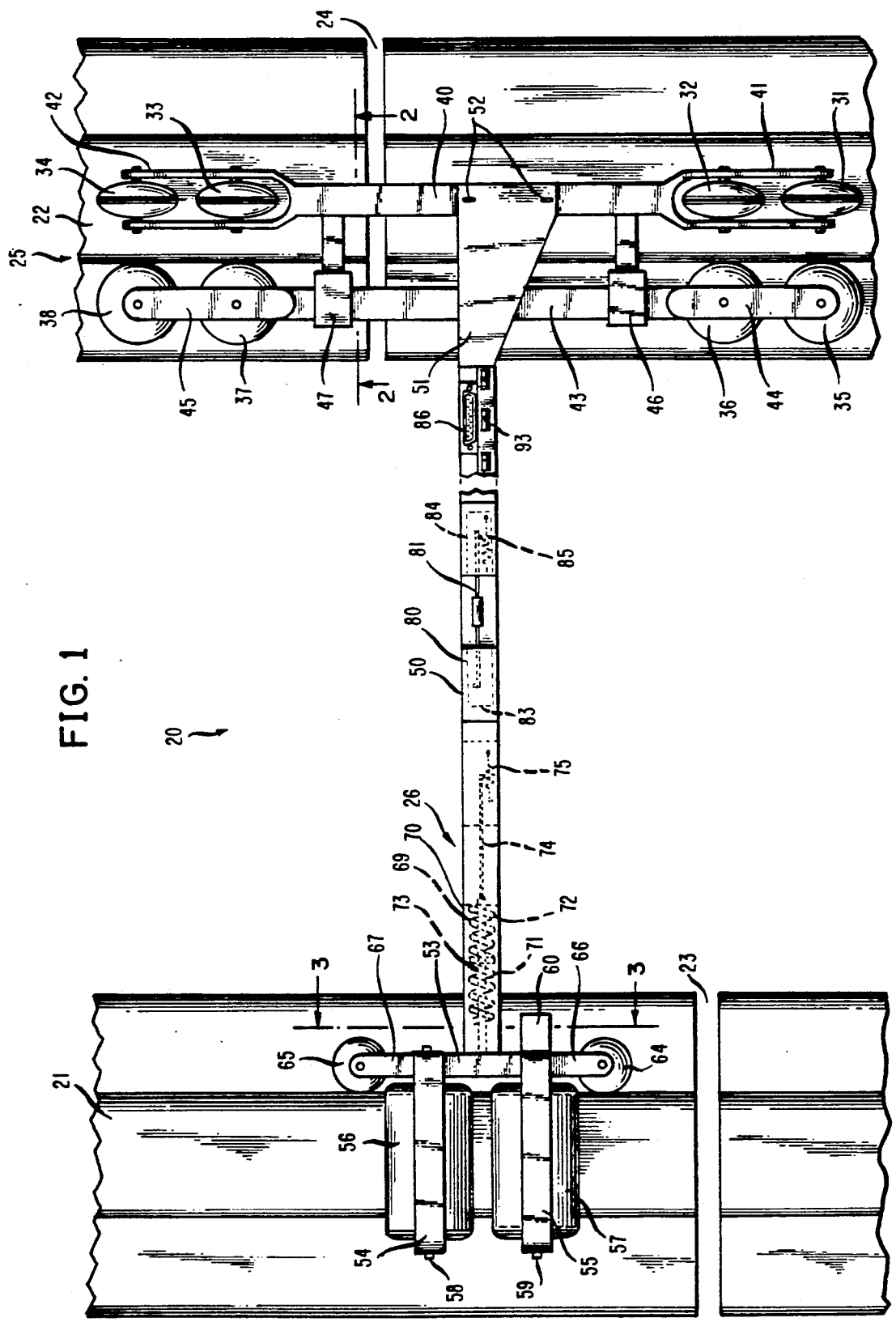
FIG. 1 is a top plan view, partly diagrammatic, of the preferred embodiment.
Figure 2:
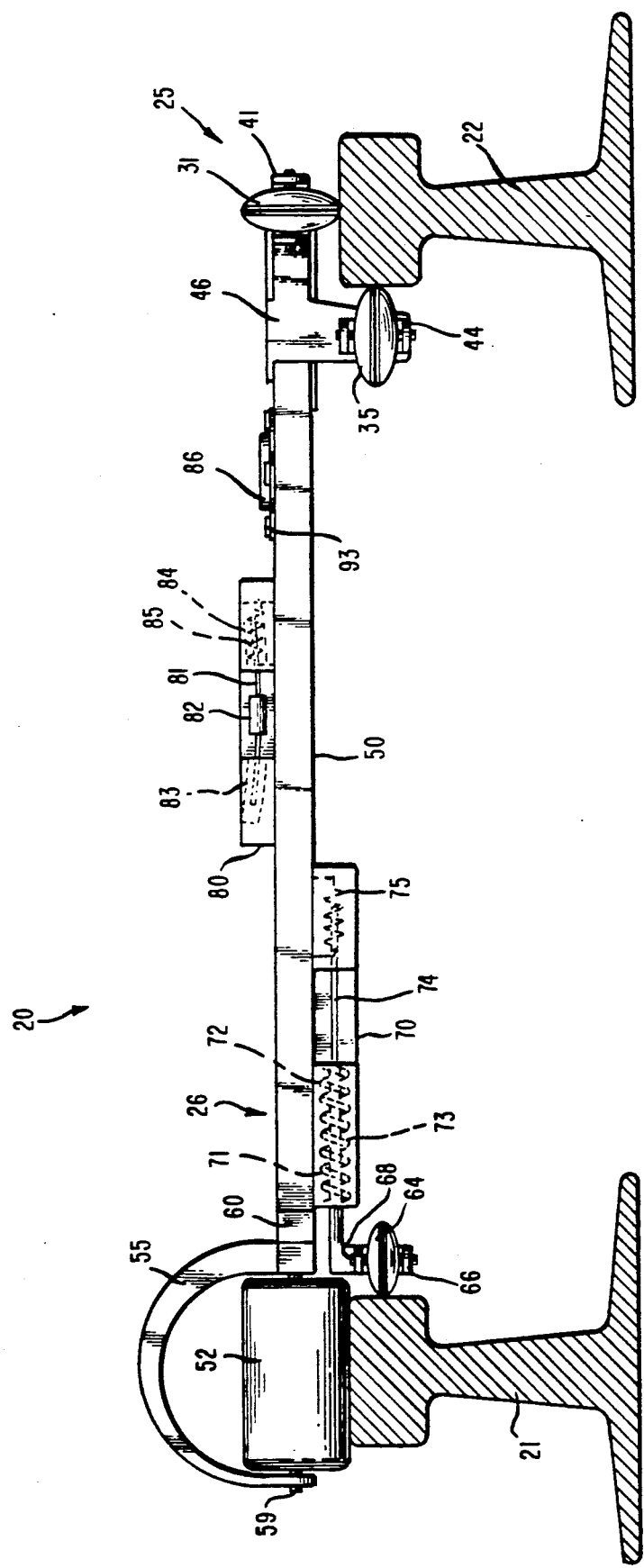
FIG. 2 is a front elevation, partly in section and partly diagrammatic, of the preferred embodiment.
Figure 3:
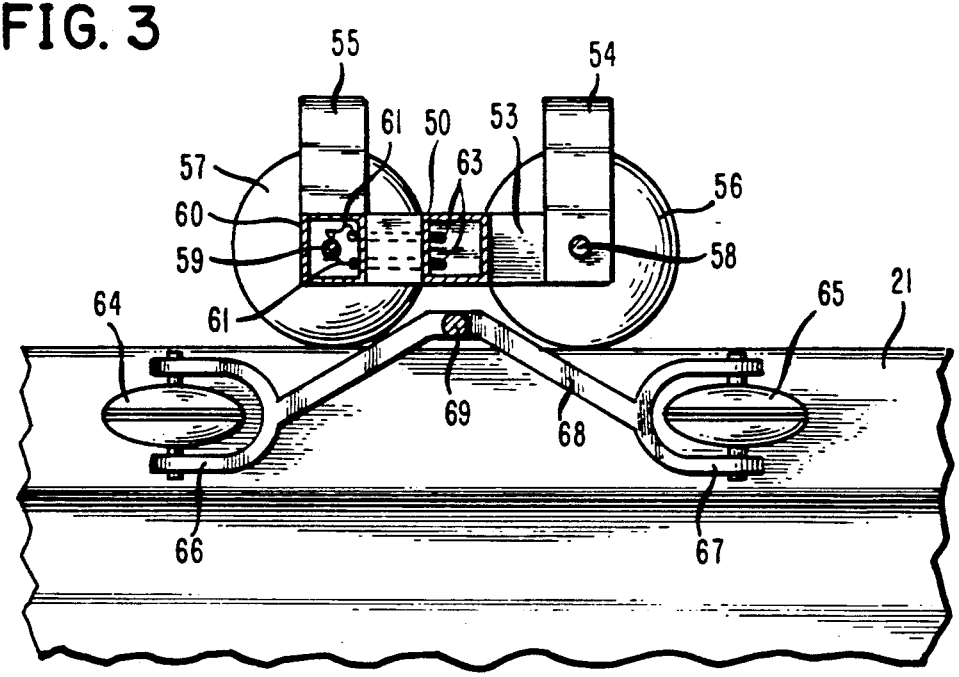
FIG. 3 is a cross section of the preferred embodiment taken on the line 3—3 of FIG. 1 and looking in the direction of the arrows.

Referring now to the drawings, there is shown in FIGS. 1-3 a railroad track inspection instrument 20 mounted in its operating position on a pair of conventional railroad tracks 21, 22. Track 21 is shown with a short space to represent a typical track joint 23 and track 22 includes a similar track joint 24. The instrument 20 includes a carriage 25 that rides on the track 22. A carriage is joined, via removable pins 52, to a sensor assembly 26 that rides on the track 21.

Carriage 25 includes four pairs of running wheels 31-38. A first pair of closely spaced running wheels 31, 32 are mounted at one end of a first support bar 40 by a U-shaped wheel bracket 41. A similar U-shaped wheel bracket 42, mounted at the other end of bar 40, supports a second pair of closely spaced running wheels 33, 34.

A second support bar 43 (FIG. 3) is joined to bar 40 by a pair of spaced L-shaped braces 46, 47. Brace 47 is shown in detail in FIG. 5. The bar 43 has U-shaped wheel brackets 44, 45 mounted at either end thereof. Brackets 44, 45, similar to brackets 41, 42 on bar 40, support first and second pairs of side running wheels 35-38.

It is noted that the running wheels 31-38 in each pair are spaced a sufficient distance so as to be capable of straddling the open space of joint 24. As such, because one wheel of each pair will always remain in contact with the upper or side surface of track 22, the wheels 31-38 will not catch in the joint 24 and the instrument 20 will ride smoothly on the tracks 21, 22.

The sensor assembly 26 includes a cross-level bar 50 that is attached to the bar 40 via a brace 51 that is shown in detail in FIG. 4. A pair of pull pins 52 are removably inserted in matching holes formed in brace 51 and bar 40 to lock the carriage 25 and the assembly 26 to each other. When separated, by removal of the pins 52 from their mating holes, the carriage 25 and bracket 26 break down into two easily carried elements.

The cross-level bar 50 is joined at its other end to a cross bar 53 that supports a pair of C-shaped wheel brackets 54, 55. A pair of elongated measuring wheels 56, 57, fixed on axles 58, 59, are rotatively mounted in brackets 54, 55, respectively. One end of axle 59 extends into a housing for supporting a track-length sensor 60 that is mounted on bracket 55. Detector 60 includes a pair of resilient electrical contacts 61 (FIG. 3) that engage the end of axle 59 which carries an insulating contact 62 embedded in the conductive axle 59. The axle 59, being electrically conductive except for the small insulating contact 62, makes and breaks a circuit between contacts 61 as the axle 59 rotates. As will become clear below, this action will produce pulses that control a digital counter for sensing the length of track 21, 22 that is traversed by instrument 20. The contacts 61 are connected to conductors 63 that run through the interior of cross bar 53 and cross-level bar 50. It is also noted that wheels 56 57 are separated from each other by a short distance to prevent rough operation when passing a joint 23.

A pair of gage wheels 64, 65 are rotatively mounted in U-shaped wheel brackets 66, 67 that are mounted at opposite ends of a V-shaped bracket 68 that is part of a sliding gage bar 69. A gage sensor 70, secured to the underside of cross-level bar 50, slideably supports the bar 69. A pair of equal tension springs 71, 72, housed in a first portion of sensor 70, engages a flange 73 that is secured to the gage bar 69. A contact arm 74 extends from the bar 69 into engagement with a linear resistor 75 that is located in a second portion of sensor 70. The relative position of contact arm 74 with respect to resistor 75 will be a measure of the gage. The resistor 75 is preferably digital, having a plurality of spaced contacts, to provide an easily processed digital output signal.

A cross-level sensor 80, mounted on the upper side of the cross-level bar 50, includes a bowed cross-level rod 81 with a plumb 82 fixed thereto. Rod 81 is electrically conductive and is free to slide or float in opposed bearings 83, 84. The wall of bearing 83 is conductive while the wall of bearing 84 includes a linear resistor 85 that is in sliding contact with conductive rod 81. Resistor 85 is preferably digital.

Figure 7:
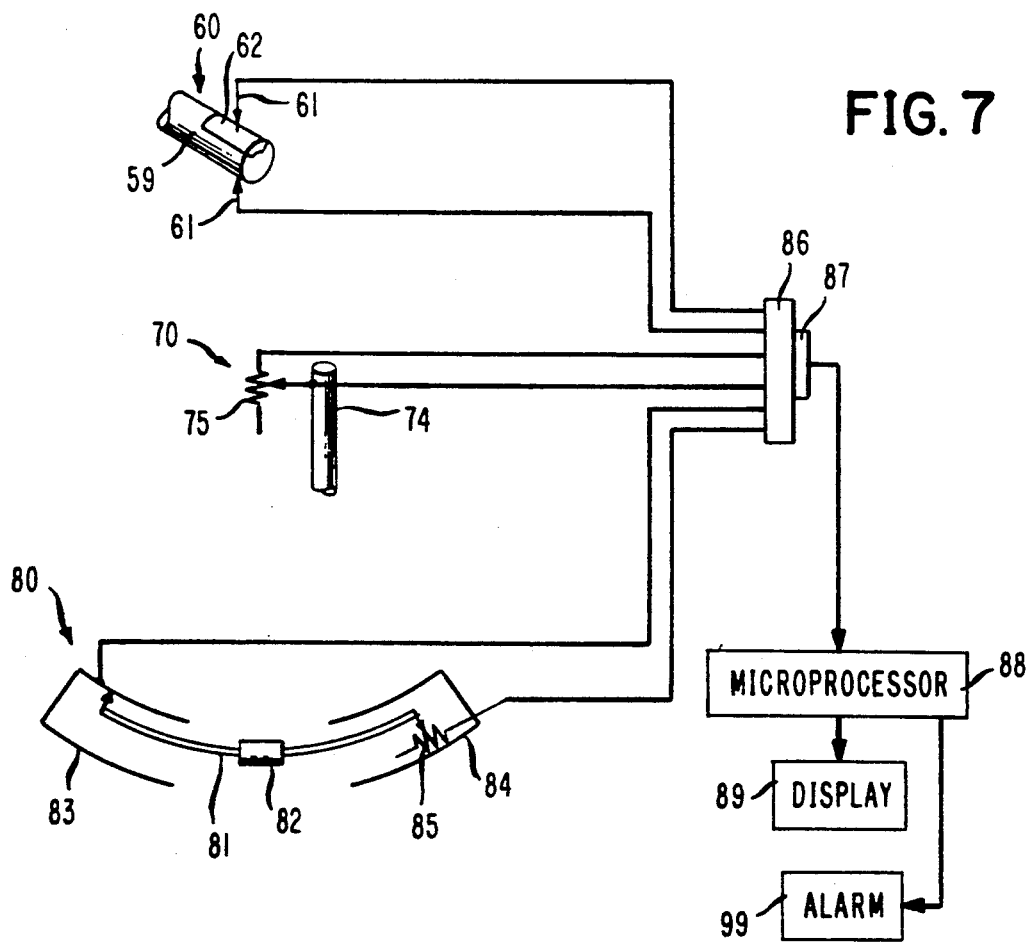
FIG. 7 is a schematic diagram illustrating details of an electrical circuit used in the preferred embodiment.

An electrical receptacle 86, mounted on the upper surface of cross-level bar 50, includes conventional output terminals to which conductors are connected that extend from contacts 61 of distance sensor 60, resistor 75 and arm 74 of gage sensor 70, and bearing 83 and resistor 85 of level sensor 80 (FIG. 7). Receptacle 86 is designed to receive a mating plug 87 that provides electrical connections to microprocessor 88 which in turn has an output that is connected to a display 89 and an alarm 99. Plug 87, microprocessor 88, display 89 and alarm 99 are mounted on a removable handle 90.

Handle 90 has a hand grip 98 at one end. The other end supports a half hinge 92 that mates with a similar half hinge 93 located on the upper surface of bar 50 adjacent to receptacle 86. A hinge pin is used to attach the handle 90 to the bar 50 via the half hinges 92, 93.

While the instrument 20 may be fabricated from a variety of commercially available materials, it is preferred that most of the elements be constructed of lightweight materials so that the instrument 20 may be easily manipulated, carried and assembled by a single operator. The three basic instrument components, namely the handle 90, the carriage 25 and the sensor assembly 26, may be formed primarily from tubular aluminum. Electrical wiring extending between the sensors 60, 70, 80 and the receptacle 86 may be located inside the cross-level bar 50. For obvious safety reasons, the wheels 31-38, 56, 57, 64, 65 should preferably be made from an appropriate non-conductive material such as neoprene or the like.

After initializing and/or calibrating the instrument 20, the inspector may operate the instrument 20 by simply grasping the handle 90 and propelling the instrument 20 along the tracks 21, 22. As he walks along the tracks 21, 22, the inspector must insure that the wheels 31-34 of carriage 25 ride on the track 22 such that the side wheels 35-38 are in firm contact with and roll on the inside surface of track 22. With the carriage 25 properly riding on track 22, the inspector must also insure that the measuring wheels 56, 57 are rolling smoothly on the upper surface of track 21 while the gage wheels 64, 65 are engaging and rolling on the inside surface of track 21. The springs 71, 72 will bias the sliding gage bar 69 to insure that the wheels 35-38, 65, 66 remain in contact with the proper surfaces of the tracks 21, 22.

In a typical inspection instrument 20, the wheels 31-38, 56, 57, would be in the order of a few inches in diameter with adjacent wheels spaced about one inch to insure a smooth transition across wide track joints. The wheels 56, 57 may be about three to six inches in width. The gage wheels 64, 65 may be smaller in diameter than the other wheels and are preferably spaced about six inches. Most rigid elements such as wheel brackets 41, 42, 44, 45, 54, 55, 66, 67, cross-level bar 50, support bars 40, 43, cross bar 53, brace 51, handle 90 are preferably formed from light-weight materials such as aluminum, plastic and the like for easy handling and carrying.

Obviously, many modifications, variations and applications of the present invention are possible in the light of the above teachings. For example, the microprocessor unit 88 may include means by which a number of gage and cross level values may be manually inputted by the inspector so that a warning signal will be sounded or displayed by alarm 99 when the measured values exceed the stored values. Still further, the unit 88 could include a recorder for memorizing a complete detailed history of an inspection for playback through the display 89 or into a computer for further evaluation. For a standard track, the gage read-out on display 89 would be calibrated at 56½ inches and would preferably increase and decrease in increments of an eighth of an inch for about two inches in each direction. The alarm 99 could be programmed to operate when the measured gage exceeds some predetermined stored value that may be an inch on either side of the calibrated value of 56½ inches. As such, the instrument 20 will enable an inspector who is performing a periodic walking inspection to write a more accurate description of any repairs needed and the exact length of track to be replaced or repaired. It is conceived that a typical instrument 20 could be operated at a speed of five miles an hour by a walking inspector as compared to a current speed of about one-half mile per hour. Because the instrument 20 can be made sturdy, long lasting and accurate, it could be readily modified for easy attachment to a small rail car for even higher-speed track inspections The foregoing disclosure and drawings are merely illustrative of the principle of this invention and are not to be interpreted in a limiting sense. It is to be understood that the invention should not be limited to the exact details of construction shown and described because obvious modifications will occur to a person skilled in the art.

What is claimed is:

1. An instrument for measuring the geometry of a pair of railroad tracks comprising:
   a carriage having mobile means for permitting said carriage to ride on one of said tracks, said mobile means including a plurality of top running wheels and a plurality of side running wheels and said carriage including means for supporting said top running wheels to roll on the top surface of said one of said tracks and means for supporting said side running wheels to roll on the side surface, of said one of said tracks;
   an elongated cross-level bar having first and second ends, said first end being mounted on said carriage;
   roller means connected to said second end of said cross-level bar for supporting said bar and for permitting said instrument to ride on the other of said tracks, said roller means including support means for mounting a plurality of measuring wheels to roll on the top surface of said other of said tracks;
   a plurality of gage wheels slideably mounted on said cross-level bar and positioned for rolling on the inside surface of said other of said tracks including spring bias means coupled to said gage wheels and said cross-level bar for biasing said gage wheels against the inside surface of said other of said tracks and for biasing said side running wheels against the inside surface of said one of said tracks;
   sensor means mounted on said bar, comprising a first means for sensing the gage of said tracks, a second means for sensing the cross-level of said tracks, and a third means for measuring the linear distance that said instrument moves with respect to said tracks, said sensor means further including gage sensing means coupled to said gage wheels for sensing relative position of said gage wheels with respect to said cross-level bar, said gage sensing means including a linear resistor.

2. The instrument of claim 1 wherein said linear resistor includes means for providing a digital output signal indicative of the gage of said track.

3. An instrument for measuring the geometry of a pair of railroad tracks comprising:
   a cartridge having mobile means for permitting said carriage to ride on one of said tracks, said mobile means including a plurality of top running wheels and a plurality of side running wheels and said carriage including means for supporting said top running wheels to roll on the top surface of said one of said tracks and means for supporting said side running wheels to roll on the side surface of said one of said tracks;
   an elongated cross-level bar having first and second ends, said first end being mounted on said carriage;
   roller means connected to said second end of said cross-bar for supporting said bar and for permitting said instrument to ride on the other of said tracks, said roller means including support means for mounting a plurality of measuring wheels to roll on the top surface of said other of said tracks;
   a plurality of gage wheels slideably mounted on said cross-level bar and positioned for rolling on the inside surface of said other of said tracks including spring bias means coupled to said gage wheels and said cross-level bar for biasing said gage wheels against the inside surface of said other of said tracks and for biasing said side running wheels against the inside surface of said one of said tracks;
   sensor means mounted on said bar, comprising a first means for sensing the gage of said tracks, a second means for sensing the cross-level of said tracks, and a third means for measuring the linear distance that said instrument moves with respect to said tracks, said sensor means further including a cross-level sensing means for sensing the relative angle that the cross-level bar makes with the horizontal said cross-level sensing means including a plumb slideably mounted on said cross-level bar and a linear resistor means coupled to said plumb for sensing the relative position of said cross-level bar with respect to said plumb.

4. The instrument of claim 3 further including a removable handle pivotally attached to said cross-level bar.

5. The instrument of claim 4 further including a digital meter mounted on said handle and electrically connected to said sensor means, said meter having a display means for displaying the instantaneous gage and cross-level of said track, and the length of track traversed by said instrument.

6. The instrument of claim 5 wherein said meter includes an alarm means for providing an alarm signal when the gage and cross-level exceed predetermined values.

* * * * *